United States Patent [19]

Colman et al.

[11] Patent Number: 4,576,724

[45] Date of Patent: Mar. 18, 1986

[54] CYCLONE SEPARATOR

[76] Inventors: Derek A. Colman, 19 Osprey Close, Lordswood, Southampton SO1 8EX; Martin T. Thew, 7 Court Close, Bitterne, Southampton SO2 5EJ, both of England

[21] Appl. No.: 707,529

[22] Filed: Mar. 4, 1985

Related U.S. Application Data

[63] Continuation of Ser. No. 593,270, Mar. 26, 1984, abandoned, and Ser. No. 389,489, Jun. 17, 1982, abandoned.

[30] Foreign Application Priority Data

Jun. 25, 1981 [GB] United Kingdom .................. 8119565

[51] Int. Cl.[4] ........................ B01D 37/00; B01D 29/00

[52] U.S. Cl. .................................. 210/788; 210/512.1; 55/52; 55/447; 209/144; 209/211

[58] Field of Search ............... 210/252, 261, 262, 322, 210/512.1, 512.2, 787, 788; 55/447, 52; 209/144, 211

[56] References Cited

U.S. PATENT DOCUMENTS 4,237,006 12/1980 Colman et al. ........................ 210/788

4,251,368 2/1981 Colman et al. ........................ 210/788

FOREIGN PATENT DOCUMENTS 1583742 2/1981 United Kingdom .

*Primary Examiner*—Richard V. Fisher

*Assistant Examiner*—Wanda L. Millard

*Attorney, Agent, or Firm*—Cushman, Darby & Cushman

[57] ABSTRACT

A cyclone separator for removing oil from seawater, the oil being up to a few percent of the volume, is proportioned as follows, symbols having the meaning shown on the FIGURE, a notable feature being the smallness of $d_o$, the overflow: $10 \leqq l_2/d_2 \leqq 25$; $0.04 < 4A_i/\pi d_1^2 \leqq 0.10$; $d_o/d_2 < 0.1$; $d_1 > d_2$; $d_2 > d_3$. The half-angle of the convergence of the taper $T_2$ is from 20′ to 2°.

18 Claims, 1 Drawing Figure

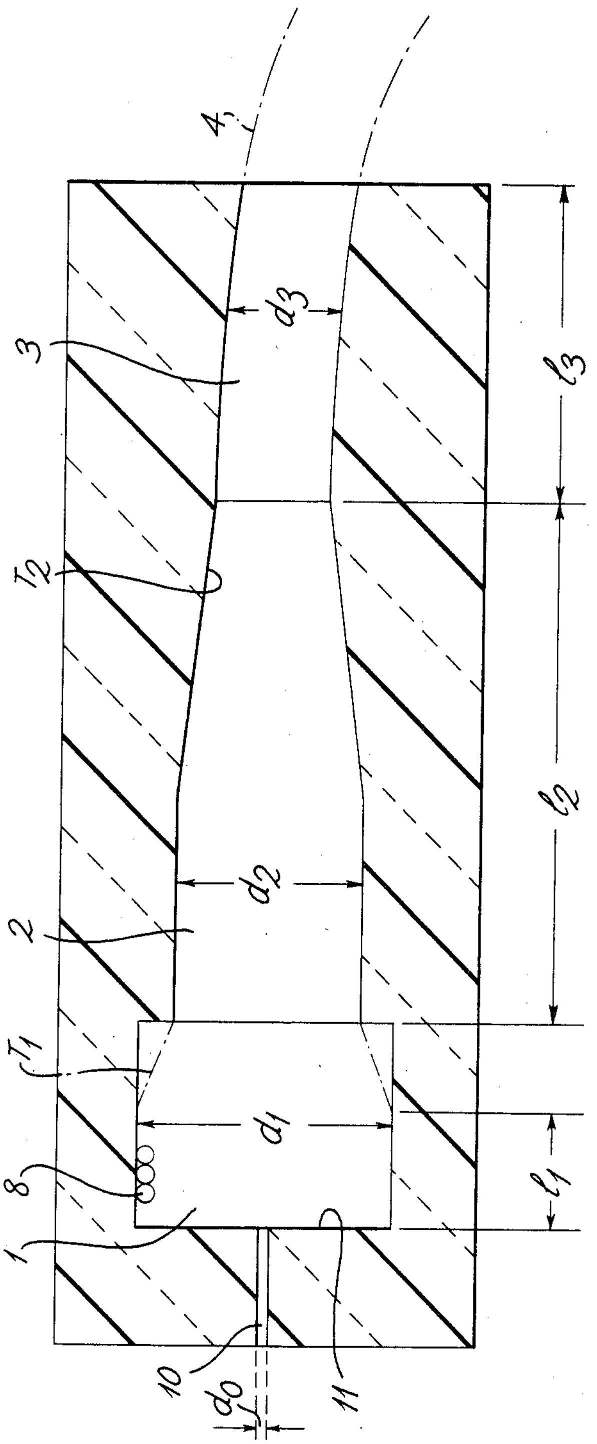
4
3
$d_3$
$l_3$
$r_2$
$l_2$
$d_2$
2
$r_1$
$d_1$
8
$l_1$
1
10
11
$d_0$

CYCLONE SEPARATOR

This is a continuation, application Ser. No. 593,270 & 389,489, filed Mar. 26, 1984 and June 17, 1982, respectively, both of which are now abandoned.

This invention is about a cyclone separator. This separator may find application in removing a lighter phase from a large volume of a denser phase, such as oil from water, with minimum contamination of the more voluminous phase. Most conventional cyclone separators are designed for the opposite purpose, that is removing a denser phase from a large volume of a lighter phase, with minimum contamination of the less voluminous phase.

This invention is a cyclone separator defined as follows. The cyclone separator has a generally cylindrical first portion with a plurality of substantially identical substantially equally circumferentially spaced tangentially directed feeds (or groups of feeds), and, adjacent to the first portion and substantially coaxial therewith, a generally cyclindrical/tapered second portion open at its far end. The first portion has an axial overflow outlet opposite the second portion (i.e. in its end wall). The second portion comprises a flow-smoothing taper converting towards its said far end, where it leads into a substantially coaxial generally cylindrical third portion. The internal diameter of the axial overflow outlet is $d_o$, of the first portion is $d_1$, of the divergent end of the taper comprised in the second portion is $d_2$, of the convergent end of the taper is $d_3$, and of the third portion is also $d_3$. The internal length of the first portion is $l_1$ and of the second portion is $l_2$. The total cross-sectional area of all the feeds measured at the points of entry normal to the inlet flow is $A_i$. The shape of the separator is governed by the following relationships:

$$10 \leqq l_2 d_2 \leqq 25$$

$$0.04 \leqq 4A_i/\pi d_1 \leqq 0.10$$

$$d_o/d_2 < 0.1$$

$$d_1 > d_2$$

$$d_2 > d_3.$$

The half-angle of the convergence of the taper is 20′ to 2°, perferably up to 1°. The taper is preferably frustoconical. Optionally the half-angle is such that half-angler (conicity)=arctan $((d_2\text{-}d_3)/2l_2)$, i.e. of such slight angle that the taper occupies the whole length of the second portion.

Preferably, $d_3/d_2$ is from 0.4 to 0.7. Preferably, where the internal length of the third portion is $l_3$, $l_3/d_3$ is at least 15 and may be as large as desired, preferably at least 40. $l_1/d_1$ may be from 0.5 to 5, preferably from 1 to 4. $d_1/d_2$ may be from 1.5 to 3.

For maximum discrimination with especially dilute lighter phases, it was thought necessary to remove, through the axial overflow outlet, not only the lighter phase but also a certain volume contributed by a near-wall flow travelling radially inwardly towards the axis (where, in operation, the lighter phase tends to collect on its way to the axial overflow outlet). It was accordingly proposed to provide, within the axial overflow outlet, a further concentric outlet tube of the desired narrowness, thus creating a third outlet from the cyclone separator into which the lighter phase is concentrated. While this design works entirely satisfactorily, it is complicated by reason of having three outlets and we now unexpectedly find that, when using merely a small axial overflow outlet, the near-wall flow tends to detach itself from the end wall before reaching that outlet, and recirculates (and is 're-sorted') within the cyclone separator, leading to a welcome simplification. Furthermore, the proportion of heavy fine solids in the overflow outlet falls because of advantageous changes in the flow pattern. (Such solids are generally preferably absent in that outlet).

Preferably $d_o/d_2$ is at least 0.008, more preferably from 0.01 to 0.08, most preferably 0.02 to 0.06. The feeds are advantageously spaced axially from the axial overflow outlet. Pressure drop in the axial overflow outlet should not be excessive, and therefore the length of the "$d_o$" portion of the axial overflow outlet should be kept low. The outlet may widen by a taper or step.

A flow-smoothing taper may be interposed between the first portion and the second portion, preferably in the form of a frustoconical internal surface whose larger-diameter end has a diameter $d_1$ and whose smaller-diameter end has a diameter $d_2$ and whose conicity (half-angle) is preferably at least 10°. For space reasons it may be desired to curve the third portion gently, and a radius of curvature of the order of 50 $d_3$ is possible.

The actual magnitude of $d_2$ is a matter of choice for operating and engineering convenience, and may for example be 10 to 100 mm.

Further successively narrower fourth, fifth . . . portions may be added, but it is likely that they will increase the energy consumption to an extent outweighing the benefits of extra separation efficiency.

The invention extends to a method of removing a lighter phase from a larger volume of a denser phase, comprising applying the phases to the feeds of a cyclone separator as set forth above, the phases being at a higher pressure than in the axial overflow outlet and in the far end of the third portion. The pressure drop to the end of the third portion (clean stream) is typically only about half that to the axial overflow outlet (dispersion-enriched stream), and the method must accommodate this feature.

This method is particularly envisaged for removing oil (lighter phase) from water (denser phase), such as oil-field production water or sea water, which may have become contaminated with oil as a result of spillage, shipwreck, oil-rig blow-out or routine operations such as bilge-rinsing or oil-rig drilling.

The feed rate (in $m^3/s$) of the phases to the cyclone separator preferably exceeds $6.8 d_2^{2.8}$ where $d_2$ is in meters. The method preferably further comprises, as a preliminary step, eliminating gas from the phases such that in the inlet material the volume of any gas is not more than ½%.

Where however the gas content is not too large, the gas itself may be treated as the lighter phase to be removed in the method. As liquids normally become less viscous when warm, water for examble being approximately half as viscous at 50° C. as at 20° C., the method is advantageously performed at as high a temperature as convenient.

The invention extends to the products of the method (such as concentrated oil, or cleaned water).

The invention will now be described by way of example with reference to the accompanying drawing, which shows, schematically, a cyclone separator according to the invention. The drawing is not to scale.

A generally cylindrical first portion 1 has two identical equally-circumferentially-spaced groups of feeds 8 (only one group shown) which are directed tangentially, both in the same sense, into the first portion 1, and are slightly displaced axially from a wall 11 forming the 'left-hand' end as drawn, although, subject to their forming an axisymmetric flow, their disposition and configuration are not critical. Coaxial with the first portion 1, and adjacent to it, is a generally cylindrical second portion 2, which opens at its far end into a coaxial generally cylindrical third portion 3. The third portion 3 opens into collection ducting 4. The feeds may be slightly angled towards the second portion 2 to impart an axial component of velocity, for example by 5° from the normal to the axis.

The first portion 1 has an axial overflow outlet 10 opposite the second portion 2.

In the present cyclone separator, the actual relationships are as follows:

$d_1/d_2=2$. This is a compromise between energy-saving and space-saving considerations, which on their own would lead to ratios of around 3 and 1.5 respectively.

Taper half-angle=40′ ($T_2$ on Figure).

$d_3/d_2=0.5$.

$l_1/d_1=1.0$. Values of from 0.5 to 4 work well.

$l_1/d_2$ is about 22. The second portion 2 should not be too long.

The drawing shows part of the second portion 2 as cylindrical, for illustration. In our actual example, it tapers over its entire length.

$l_3/d_3=40$. This ratio should be as large as possible.

$d_o/d_2=0.04$. If this ratio is too large for satisfactory operation, excessive denser phase will overflow with the lighter phase through the axial overflow outlet 10, which is undesirable. If the ratio is too small, minor constituents (such as specks of grease, or bubbles of air released from solution by the reduced pressure in the vortex) can block the overflow outlet 10 and hence cause fragments of the lighter phase to pass out of the 'wrong' end, at collection ducting 4. With these exemplary dimensions, about 1% by volume (could go down to 0.4%) of the material treated in the cyclone separator overflows through the axial overflow outlet 10. (Cyclones having $d_o/d_2$ of 0.02 and 0.06 were also tested successfully).

$4A_i/\pi d_1^2=1/16$. This expresses the ratio of the inlet feeds cross-sectional area to the first portion cross-sectional area.

$d_2=58$ mm. This is regarded as the 'cyclone diameter' and for many purposes can be anywhere within the range 10–100 mm, for example 15–60 mm; with excessively large $d_2$, the energy consumption becomes large to maintain effective separation while with too small $d_2$ unfavourable Reynolds Number effects and excessive shear stresses arise. Cyclones having $d_2=30$ mm proved very serviceable.

The cyclone separator can be in any orientation with insignificant effect.

The wall 11 is smooth as, in general, irregularities upset the desired flow patterns within the cyclone. For best performance, all other internal surfaces of the cyclone should also be smooth. However, in the wall 11, a small upstanding circular ridge concentric with the outlet 10 may be provided to assist the flow moving radially inward near the wall, and the outer 'fringe' of the vortex, to recirculate in a generally downstream direction for resorting. The outlet 10 is a cylindrical bore as shown. Where it is replaced by an orifice plate lying flush on the wall 11 and containing a central hole of diameter $d_o$ leading directly to a relatively large bore, the different flow characteristics appear to have a slightly detrimental, though not serious, effect on performance. The outlet 10 may advantageously be divergent in the direction of overflow, with the outlet orifice in the wall 11 having the diameter $d_o$ and the outlet widening thereafter at a cone half-angle of up to 10°. In this way, a smaller pressure drop is experienced along the outlet, which must be balanced against the tendency of the illustrated cylindrical bore (cone half-angle of zero) to encourage coalescence of droplets of the lighter phase, according to the requirements of the user.

To separate oil from water (still by way of example), the oil/water mixture is introduced at 50° C. through the feeds 8 at a pressure exceeding that in the ducting 4 or in the axial overflow outlet 10, and at a rate preferably of at least 160 liter/minute, with any gas in the inlet limited to ½% by volume. The size, geometry and valving of the pipework leading to the feed 8 are so arranged as to avoid excessive break-up of the droplets (or bubbles) of the lighter phase, for best operation of the cyclone separator. For the same reason (avoidance of droplet break-up), still referring to oil and water, it is preferable for no dispersant to have been added. The feed rate (for best performance) is set at such a level that (feed rate $d_2^{2.8})>6.8$ with feed rate in $m^3/s$ and $d_2$ in meters. The mixture spirals within the first portion 1 and its angular velocity increases as it enters the second portion 2. A flow-smoothing taper $T_1$ of angle to the axis 10° is interposed between the first and second portions. Alternatively worded, 10° is the conicity (half-angle) of the frustrum represented by $T_1$.

The bulk of the oil separates within an axial vortex in the second portion 2. The spiralling flow of the water plus remaining oil then enters the third portion 3. The remaining oil separates within a continuation of the axial vortex in the third portion 3. The cleaned water leaves through the collection ducting 4 and may be collected for return to the sea, for example, or for further cleaning, for example in a similar or identical cyclone or a bank of cyclones in parallel.

The oil entrained in te vortex moves axially to the axial overflow outlet 10 and may be collected for dumping, storage or further separation, since it will still contain some water. In this case too, the further separation may include a second similar or identical cyclone.

The smallness of the axial overflow outlet 10 in accordance with the invention is especially advantageous in the case of series operation of the cyclone separators, for example where the 'dense phase' from the first cyclone is treated in a second cyclone, from which the 'dense phase' is treated in a third cyclone. The reduction in the volume of 'light phase' at each stage, and hence of the other phase unwantedly carried over with the 'light phase' through the axial overflow outlet 10, is an important advantage, for example in a boat being used to clear an oil spill and having only limited space on board for oil containers; although the top priority is to return impeccably de-oiled seawater to the sea, the vessel's endurance can be maximised if the oil containers are used to contain only oil and not wasted on containing adventitious sea-water.

We claim:

1. A cyclone separator having a generally cylindrical first portion with a plurality of substantially identical substantially equally circumferentially spaced tangentially directed feeds, and, adjacent to the first portion and substantially coaxial therewith, a tapered second portion open at its far end, the first portion having an axial overflow outlet opposite the second portion, the second portion comprising a flow-smoothing taper converging towards its said far end, where it leads into a substantially coaxial generally cylindrical third portion, the internal diameter of the totality of the axial overflow outlet being $d_0$, of the first portion being $d_1$, of the divergent end of the taper comprised in the second portion being $d_2$, of the convergent end of the taper being $d_3$, of the third portion being also $d_3$, the internal length of the first portion being $l_1$ and of the second portion being $l_2$, the total cross-sectional area of all the feeds measured at the points of entry normal to the inlet flow being $A_i$, the shape of the separator being governed by the following relationships:

$$10 \leqq l_2/d_2 \leqq 25$$

$$0.04 \leqq 4A_i/\pi d_1 \leqq 0.10$$

$$d_2 > d_3$$

$$d_1 > d_2$$

the improvement comprising:

$$d_0/d_2 < 0.1$$

and wherein the half-angle of the convergence of the taper is 20' to 1°.

2. The cyclone separator of claim 1, wherein $d_0/d_2$ is at least 0.008.

3. The cyclone separator of claim 2, wherein $d_0/d_2$ is from 0.01 to 0.08.

4. The cyclone separator of claim 3, wherein $d_0/d_2$ is from 0.02 to 0.06.

5. The cyclone separator of claim 1, further comprising, interposed between the first portion and the second portion, a flow-smoothing taper.

6. The cyclone separator of claim 5, wherein the taper of claim 5 is in the form of a frustoconical internal surface whose larger-diameter end has a diameter $d_1$ and whose smaller-diameter end has a diameter $d_2$.

7. The cyclone separator of claim 13, wherein the conicity (half-angle) of the frustoconical taper is at least 10°.

8. The cyclone separator of claim 1 wherein $l_1/d_1$ is from 0.5 to 5.

9. The cyclone separator of claim 8, wherein $l_1/d_1$ is from 1 to 4.

10. The cyclone separator of claim 1, wherein $d_3/d_2$ is from 0.4 to 0.7.

11. The cyclone separator of claim 1, wherein the internal length of the third portion is $l_3$ and $l_3/d_3$ is at least 15.

12. The cyclone separator of claim 1, wherein $d_1/d_2$ is from 1.5 to 3.

13. The cyclone separator of claim 1, wherein $d_2$ is from 10 mm to 100 mm.

14. A method of removing a lighter phase from a larger volume of a denser phase, comprising applying the phases to the feeds of a cyclone separator according to any preceding claim, the phases being at a higher pressure than in the axial overflow outlet and in the far end of the third portion.

15. The method of claim 16, wherein the feed rate (in $m^3/s$) of the phases to the cyclone separator exceeds $6.8d_2^{2.8}$ (where $d_2$ is in meters).

16. The method of claim 14, wherein the lighter phase is gas.

17. The method of claim 14, wherein the lighter phase is oil and the denser phase is water.

18. The method of claim 14, further comprising, as a preliminary step, eliminating gas from the phases such that in the inlet material the volume of any gas is not more than $\frac{1}{2}\%$.

* * * * *